(12) United States Patent
Miyashita et al.

(10) Patent No.: US 7,560,844 B2
(45) Date of Patent: Jul. 14, 2009

(54) PERMANENT MAGNET ROTARY MOTOR

(75) Inventors: Toshihito Miyashita, Nagano (JP);
Satoru Onodera, Nagano (JP);
Kazuyuki Kitazawa, Nagano (JP);
Masahiro Koyama, Nagano (JP);
Kazuhiko Takizawa, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 295 days.

(21) Appl. No.: 11/388,697

(22) Filed: Mar. 24, 2006

(65) Prior Publication Data
US 2006/0214533 A1 Sep. 28, 2006

(30) Foreign Application Priority Data
Mar. 25, 2005 (JP) ............................. 2005-088638

(51) Int. Cl.
*H02K 1/00* (2006.01)
*H02K 3/48* (2006.01)

(52) U.S. Cl. .................. 310/216; 310/12; 310/42; 310/43; 310/217; 310/218; 310/254; 310/256; 310/258; 310/259

(58) Field of Classification Search .............. 310/216, 310/258, 156.01, 259, 218, 217, 42, 43, 12, 310/254, 256; H02K 5/24
See application file for complete search history.

(56) References Cited

U.S. PATENT DOCUMENTS 3,056,896 A * 10/1962 Ludemann et al. .......... 310/258
3,257,572 A * 6/1966 Heilmann et al. ........... 310/190
6,225,725 B1 * 5/2001 Itoh et al. ................... 310/254
6,429,568 B1 * 8/2002 Shen et al. .................. 310/254
7,141,905 B2 * 11/2006 Vollmer ...................... 310/216

FOREIGN PATENT DOCUMENTS

| JP | 02-007839 | 1/1990 |
| JP | 2000-032690 | 1/2000 |
| JP | 2002-010539 | 1/2002 |
| JP | 2002-199630 | 7/2002 |

OTHER PUBLICATIONS

Kitakawa et al (JP 2000-32690, English translation).*
JP_200032690_EN.pdf: Kitakawa et al (JP 2000-32690, IDS, English translation).*

* cited by examiner

*Primary Examiner*—Quyen Leung
*Assistant Examiner*—John K Kim
(74) *Attorney, Agent, or Firm*—Rankin, Hill & Clark, LLP (57) ABSTRACT

A permanent magnet rotary motor is provided in which cogging torque can be reduced and an increase in copper loss can also be prevented. A first divided core unit 13 is combined with a second divided core unit 15, thereby constituting a stator core 9. The first divided core unit 13 constitutes a yoke portion 17. The second divided core unit 15 includes pole pieces 25, magnetic pole surface constituent portions 27, and first and second type connecting portions 29A and 29B each mutually couple two adjacent magnetic pole surface constituent portions 27, all of which are formed integral with one another. The thickness of the first type connecting portions 29A in a radial direction of the stator core 9 is set to be smaller than the thickness of the second type connecting portions 29B in the radial direction of the stator core 9.

3 Claims, 9 Drawing Sheets

PERMANENT MAGNET ROTARY MOTOR

BACKGROUND OF THE INVENTION

The present invention relates to a permanent magnet rotary motor.

Japanese Patent Application Laid-Open Publication No. 199630/2002 (hereinafter referred to as Patent Document 1) discloses a brushless motor including a stator core constituted by fitting a first divided core unit into a second divided core unit. The first divided core unit is shaped to constitute an annular yoke. The second divided core unit is constituted by including a plurality of pole pieces around which exciting wiring portions are wound, a plurality of magnetic surface constituent portions provided at ends of the pole pieces, respectively, and a plurality of connecting portions each coupling two adjacent magnetic surface constituent portions to each other. The pole pieces, magnetic surface constituent portions, and the connecting portions are formed integrally with one another. In a rotor in this conventional brushless motor, the number of permanent magnets is made to be different from the number of the pole pieces. Further, lengths of the connecting portions in a circumferential direction of the annular yoke are made to be different. Reduction in torque pulsation (cogging torque) is thereby achieved.

Japanese Patent Application Laid-Open Publication No. 10539/2002 (hereinafter referred to as Patent Document 2) discloses an armature of a motor including a stator core in which two adjacent magnetic pole surface constituent portions are connected by a connecting portion, thereby closing a slot. In this stator core, a plurality of openings are formed in connecting portions for closing the slots. The openings are formed in an axial line direction of a rotary axis of the motor in a discontinuous manner and open in a radially inward direction and toward slots. These openings are provided to prevent magnetic flux leakage between magnetic poles.

In the motor disclosed in Patent Document 1, however, sectional shapes of respective slots of the motor are different. Accordingly, the lamination factor of windings among a slot cannot be made to be constant. Then, when the number of the windings is therefore increased to increase the torque, the size of the stator core will be increased.

The motor disclosed in Patent Document 2 further needs a step of forming the openings in the connecting portions that pass through in the radial direction of a rotor after steel plates have been rotated and laminated. The number of manufacturing steps is therefore increased. In addition, manufacture of the motor is very complicated.

An object of the present invention is therefore to provide a permanent magnet rotary motor in which cogging torque can be reduced without greatly reducing torque and in which the lamination factor of windings within each slot can be enhanced.

Other object of the present invention is to provide a permanent magnet rotary motor that can be easily manufactured and can also reduce the cogging torque.

SUMMARY OF THE INVENTION

A permanent magnet rotary motor on which the present invention aims at improvement includes a rotor; a stator core; and a plurality of exciting winding portions. The rotor includes a rotor core; and permanent magnet magnetic pole portions constituted by P (P: a natural even number) permanent magnets mounted to the rotor core. The stator core includes an annular yoke; N pole pieces (N: a natural even number) arranged on the inside of the annular yoke at intervals in a circumferential direction of the annular yoke; N slots each located between two adjacent ones of the N pole pieces; a plurality of magnetic pole surface constituent portions; a plurality of connecting portions; and a plurality of exciting winding portions. Each of the N pole pieces has one end fixed to the yoke portion and the other end located more inwardly in a radial direction of the stator core than the one end. Each of the magnetic pole surface constituent portions is located at the other end and has a magnetic pole surface facing the rotor. Each of the connecting portions mutually couples two adjacent ones of the magnetic pole surface constituent portions. The exciting winding portions are provided at the N pole pieces, respectively. In the present invention, the connecting portions are divided into first type connecting portions and second type connecting portions. The first type connecting portions are alternately arranged in the circumferential direction, while the second type connecting portions are alternately arranged with the first type connecting portions in the circumferential direction. Then, a thickness T1 of each of the first type connecting portions in the radial direction is smaller than a thickness T2 of each of the second type connecting portions in the radial direction.

Magnitudes of cogging torques caused by the first and second types connecting portions may differ and a phase difference between the cogging torques caused by the first and second types connecting portions may be shifted by a half period. For this reason, assume that the first and second types connecting portions are alternately arranged in the circumferential direction and the thicknesses of the first and second types connecting portions in the radial direction are made to be different as in the present invention. Then, by appropriately setting the thickness of the first and second types connecting portions so that the amplitudes of the cogging torques caused by the first and second types connecting portions have the same size and so that the phase difference between the cogging torques is shifted by the half period, the cogging torque of the motor can be uniformly reduced over an entire stator after it has been arranged that the torque is not greatly reduced. In the present invention in particular, sectional shapes of the slots can be made to be the same. Accordingly, the lamination factor of windings can be kept in a certain range. Further, the stator for the rotary motor can be easily manufactured.

When the number of the permanent magnet magnetic pole portions P and the number of the slots N have a relation of P=4 m and N=6 m (m: a natural number), it is preferable that the thicknesses T1 and T2 has a relation in which a ratio T2/T1 is in the range of two to three. Generally, in the permanent magnet rotary motor, the number of the amplitudes of the cogging torque per revolution of the rotor is a least common multiple [LCM (P, N)] between the number of the permanent magnet magnetic pole portions P and the number of the slots N. When the numbers P and N have the relation of P=4 m and N=6 m (m: a natural number), the least common multiple [LCM (P, N)] between the numbers P and N is equal to a least common multiple [LCM (P, N/2)] between the number P and a number N/2. For this reason, in the motor having the relation of P=4 m and N=6 m (m: a natural number) and a motor having a relation of P=4 m and N=3 m (m: the natural number) with the number of the slots thereof halved, the numbers of the amplitudes of the cogging torques per revolution of the rotor are the same. However, the phases of the cogging torques are different by the half period or 180 degrees. Accordingly, assume that the function of the slots in the motor having the relation of P=4 m and N=6 m (m: a natural number) can be made close to the function of the slots in the motor with the number of the slots thereof halved, which has the relation of P=4 m and N=3 m. Then, due to cancelling out of the cogging torques generated by attracting power between the rotor and the respective stator slots of the motor, the cogging torque of the motor as a whole can be reduced. Accordingly, in the present invention, the thicknesses of the first type connecting portions and the second type connecting portions in the radial direction were made to be different as described above. Then, the cogging torques caused by the first and second types connecting portions that are alternately arranged in the circumferential direction were canceled out. This effect is particularly pronounced when the thicknesses T1 and T2 have the relation that the ratio T2/T1 is in the range of two to three. In this state, the sectional shapes of the slots can be made to be the same. Accordingly, reduction of inter-linkage magnetic flux can be suppressed, and the cogging torque can be thereby reduced.

When the number of the permanent magnet magnetic pole portions P and the number of the slots N have a relation of P=8 m and N=6 m (m: a natural number), it is preferable that an opening angle $\theta1$ of a part having substantially the identical thickness for each of the first type connecting portions is set to be larger than an opening angle $\theta2$ of a part having substantially the identical thickness for each of the second type connecting portions, and that an opening angle difference $\theta1-\theta2=[360°/LCM(P, N)]\times(1/3)\pm1°$. Incidentally, the "opening angle" herein means an angle between two virtual line segments, each of which connects the center of the rotor and each of the both ends of a portion of each connecting portion in the circumferential direction of the annular yoke having substantially the identical thickness. The LCM (P, N) means the least common multiple between the numbers P and N. By satisfying the conditions described above, the cogging torque of the motor can be reduced. When the opening angle difference ($\theta1-\theta2$) is below $[360°/LCM (P, N)]\times(1/3)-1°$, the cogging torque will increase, and the interlinkage magnetic flux will be reduced. When the opening angle difference ($\theta1-\theta2$) exceeds $[360°/LCM (P, N)]\times(1/3)+1°$, the cogging torque will increase.

In this case, it is preferable that the thicknesses T1 and T2 have a relation in which the ratio T2/T1 is in the range of 1.4 to 1.8. With this arrangement, reduction of the interlinkage magnetic flux will be suppressed, and the cogging torque can be reduced. When the ratio T2/T1 is below 1.4, the cogging torque will increase. When the ratio T2/T1 exceeds 1.8, the cogging torque will increase, and the interlinkage magnetic flux will be reduced.

Preferably, the stator core is formed by a combination of a plurality of divided core units each constituted by lamination of a plurality of electromagnetic steel plates. With this arrangement, the windings can be easily wound around the pole pieces, so that the stator core can be easily manufactured. In this case, the divided core units can be constituted by a first divided core unit constituting the yoke portion and a second divided core unit constituted by the pole pieces, the magnetic pole surface constituent portions, and the connecting portions. The pole pieces, magnetic pole surface constituent portions, and connecting portions are formed integrally with one another. When the divided core units are configured as described above, the stator core can be formed using the following winding methods for the exciting winding portions: in one method, insulators are arranged at the pole pieces of the second divided core unit, and the exciting windings are wound around the insulators. Then, the pole pieces are fixed to the yoke portion by fitting or the like, thereby combining the first divided core unit with the second divided core unit. The stator core can be thereby formed. In another method, the exciting windings are wound around bobbins formed of an insulating material. Then, the bobbins with the exciting windings wound therearound are mounted on the pole pieces of the second divided core unit. The pole pieces are then fixed to the yoke portion by fitting or the like. With this arrangement, the first divided core unit can be combined with the second divided core unit, and the stator core can be thereby formed. When such methods are used, the lamination factor of the exciting windings can be increased. For this reason, by selecting a desired one of the above-mentioned winding methods, the exciting windings can be easily wound around the pole pieces. In addition, in one operation of coupling the pole pieces to the yoke portion, the stator core can be formed.

The divided core units can also be constituted by a first divided core unit having the yoke portion and the pole pieces that are formed integrally with one another; and a second divided core unit having the magnetic pole constituent portions and the connecting portions that are formed integrally with one another. In this case, too, in one operation of coupling the pole pieces to the yoke portion, the stator core can be formed.

The divided core units can also be constituted by a first divided core unit having the yoke portion; a second divided core unit having the magnetic pole constituent portions and the connecting portions that are formed integrally with one another; and third divided core units each constituting each of the pole pieces. With this arrangement, even if the number of components for the permanent magnet rotary motor is increased, the exciting windings can be more easily wound around the pole pieces.

According to the present invention, when a plurality of the connecting portions are employed for the permanent magnet rotary motor, the torque increases due to the first type connecting portions, while the cogging torque is reduced due to the second connecting portions. Therefore, by appropriately setting the thickness of the first and second types connecting portions in the radial direction of the stator core and the circumferential lengths of the first and second types connecting portions that are alternately arranged in the circumferential direction, the cogging torque can be uniformly reduced over the entire stator after it has been arranged in such a manner that the torque is not greatly reduced. In the present invention in particular, the sectional shapes of the slots can be made to be same. Thus, the lamination factor of the windings can be made to be constant. Further, the permanent magnet rotary motor can be easily manufactured.

BRIEF DESCRIPTION OF THE DRAWINGS

These and other objects and many of the attendant advantages of the present invention will be readily appreciated as the same is better understood by reference to the following detailed description when considered in connection with the accompanying drawings; wherein.

DETAILED DESCRIPTION OF PREFFERED EMBODIMENTS

Figure 1:
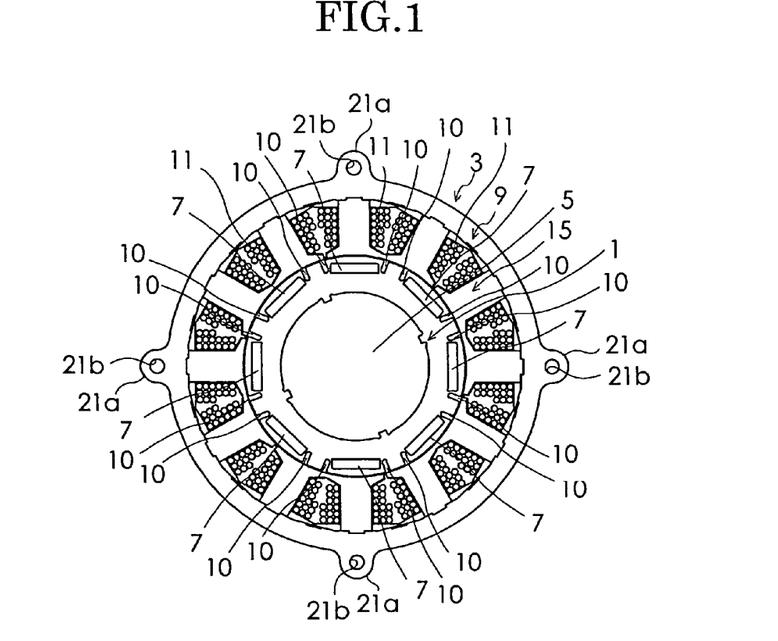
FIG. 1 is a schematic diagram showing a permanent magnet rotary motor according to a first embodiment of the present invention.

Embodiments of the present invention will be described in detail with reference to drawings. FIG. 1 is a schematic diagram of a permanent magnet rotary motor according to a first embodiment of the present invention. As shown in FIG. 1, the permanent magnet rotary motor in this embodiment includes a rotor 1 and a stator 3. The rotor 1 includes a rotor core 5 of substantially a cylindrical shape and plate-like permanent magnets 7 constituting P (herein eight) permanent magnet magnetic pole portions embedded in the rotor core 5, at equal intervals in a circumferential direction of the rotor core 5. In this embodiment, one permanent magnet 7 constitutes one permanent magnet magnetic pole portion. On both sides of each permanent magnet 7 in the circumferential direction, a pair of flux barriers 10 each constituted by a cavity are formed. The rotor core 5 is constituted by lamination of a plurality of magnetic steel plates. The eight permanent magnets 7 are magnetized so that an N pole and an S pole are alternately arranged on the surface of the rotor core 5 in the circumferential direction of the rotor core 5.

Figure 2:
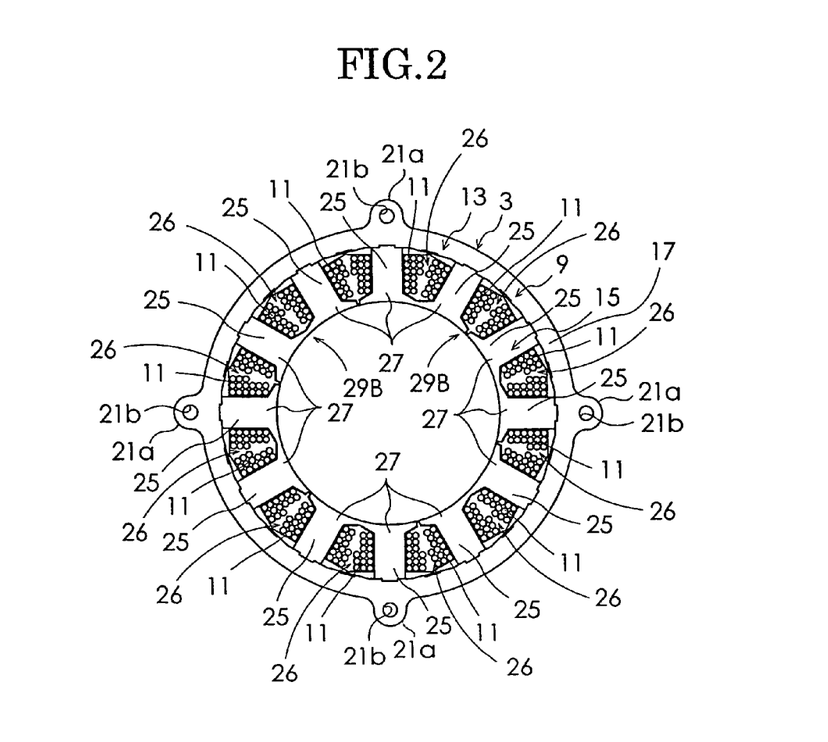
FIG. 2 is a plan view of a stator used in the permanent magnet rotary motor in the first embodiment of the present invention.
Figure 3:
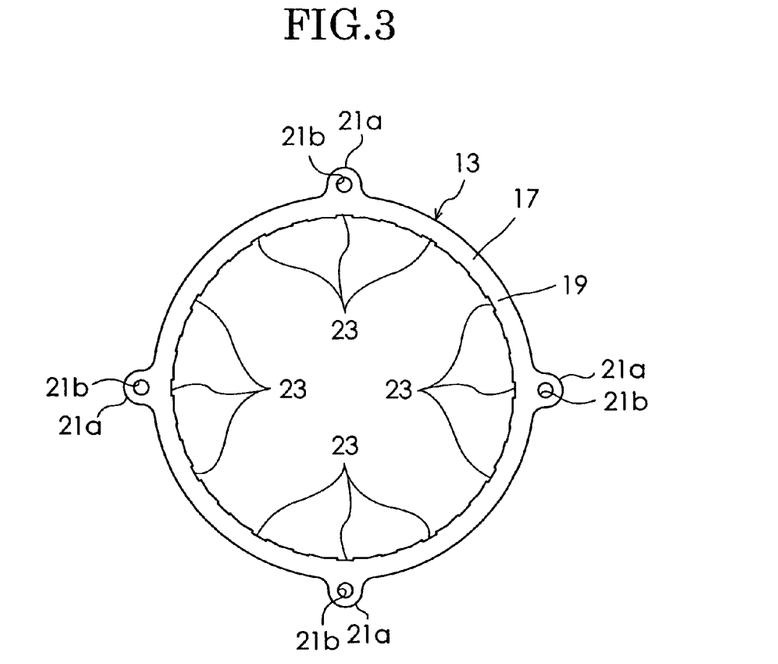
FIG. 3 is a plan view of a first divided core unit of the stator shown in FIG. 2.

The stator 3 includes a stator core 9 and exciting winding portions 11, as shown in FIG. 2. The stator core 9 is constituted by a first divided core unit 13 and a second divided core unit 15. The first divided core unit 13 constitutes an annular yoke 17, as shown in FIG. 3, and is formed by lamination of a plurality of magnetic steel plates 19. Projecting portions 21a that project in a radially outward direction of the stator core at intervals of 90 degrees are formed integrally with the yoke portion 17. A through hole 21b is formed in each of these projecting portions 21a. A bolt used when a pair of end brackets and the yoke portion 17 are combined is inserted into each through hole 21b. The end brackets are fixed on both sides of the yoke portion in an axial line direction of a rotary axis to which the rotor 1 is fixed. A plurality of groove portions 23 are formed in an inner peripheral portion of the yoke portion 17 at equal intervals in a circumferential direction of the second divided core unit 15. Convex portions 33 of the second divided core unit 15, which will be described later, are fit into the groove portions 23. These groove portions 23 continuously extend in a direction in which the magnetic steel plates 19 are laminated.

Figure 4:
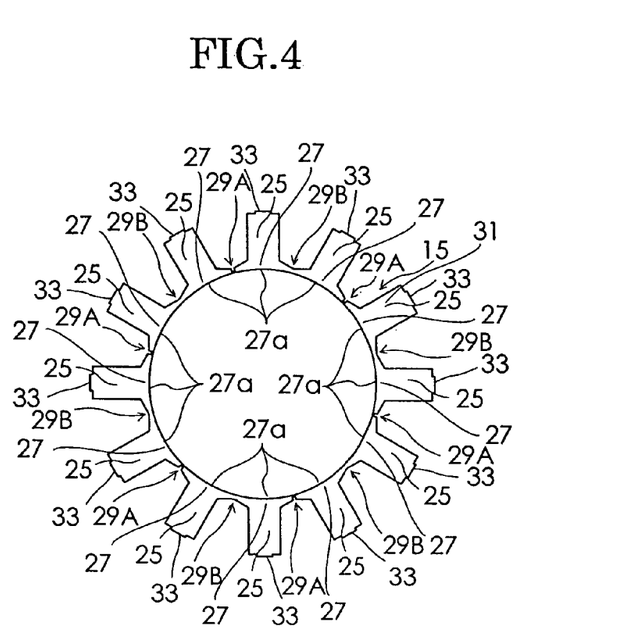
FIG. 4 is a plan view of a second divided core unit of the stator shown in FIG. 2.

The second divided core unit 15 is constituted by 12 pole pieces 25, 12 magnetic pole surface constituent portions 27, and 12 connecting portions (composed of first type connecting portions 29A and second type connecting portions 29B), which are formed integrally with one another, as shown in FIG. 4. The second divided core unit 15 is formed of lamination of a plurality of magnetic steel plates 31. The 12 pole pieces 25 are arranged at equal intervals on the inside of the yoke portion 17 in the circumferential direction of the rotor core 5. An exciting winding portion 11 is wound around each pole piece 25. A slot 26 is located between two adjacent ones of the 12 pole pieces 25, as shown in FIG. 2. With this arrangement, the number of slots is 12. A convex portion 33 is integrally provided at one end of this pole piece 25. Each convex portion 33 is fit into each groove portion 23 of the yoke portion 17. The second divided core unit 15 and the first divided core unit 13 are joined by the fitting of the convex portions 33 and the groove portions 23. A magnetic pole surface constituent portion 27 is provided at the other end of each pole piece 25 located in a radially inward direction of the stator core 9. The magnetic pole surface constituent portion 27 includes a magnetic pole surface 27a facing the rotor 1 on the side of the inner periphery of the stator core 9. Two adjacent ones of the magnetic pole surface constituent portions 27 are fixed to each other by a connecting portion 29A or a connecting portion 29B. As described before, in the permanent magnet rotary motor in this embodiment, the number of the permanent magnet magnetic pole portions P is eight, and the number of the slots N is 12. Thus, the number of the permanent magnet magnetic pole portions P and the number of the slots N have a relation of P=4 m and N=6 m (in which m is a natural number and is two in this embodiment).

Figure 5:
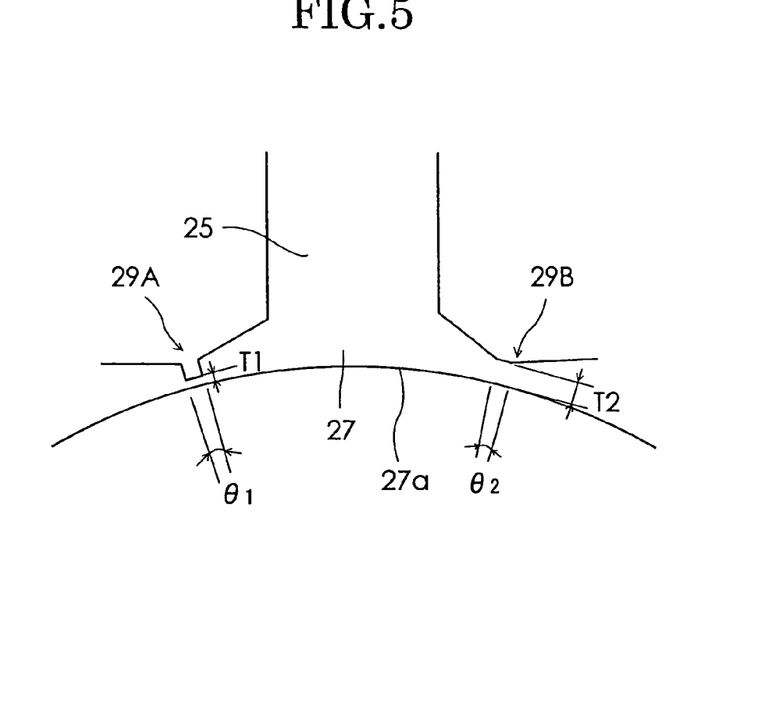
FIG. 5 is a partially enlarged view of FIG. 4.

The 12 connecting portions are divided into the first type connecting portions 29A arranged in a circumferential direction of the rotor core 5 and the second type connecting portions 29B that are alternately arranged with the first type connecting portions 29A in the circumferential direction of the rotor core 5. As shown in a partially enlarged view in FIG. 5 a thickness T1 of a first type connecting portion 29A in the radial direction of the stator core is set to be smaller than a thickness T2 of a second type connecting portion 29B in the radial direction. Further, an opening angle θ1 of a part having substantially the identical thickness T1 for each of the first type connecting portions 29A is set to be equal to an opening angle θ2 of a part having substantially the identical thickness T2 for each of the second type connecting portions 29B. In this embodiment, a ratio T2/T1 of the thickness T2 of the second type connecting portion 29B to the thickness T1 of the first type connecting portion 29A is set to be in the range of two to three.

In the permanent magnet rotary motor in this embodiment, torque increases due to the first type connecting portions 29A, and cogging torque is reduced due to the second type connecting portions 29B. For this reason, after it has been arranged so that the torque is not greatly reduced using the first and second types connecting portions 29A and 29B alternately arranged in the circumferential direction of the rotor core 5, the cogging torque can be uniformly reduced over the entire stator. In this embodiment in particular, sectional shapes of the slots 26 can be made to be same. Accordingly, the lamination factor of windings of the exciting winding portions can be made to be constant, so that an increase in copper loss can be prevented. Further, the stator for the rotary motor can be easily manufactured.

Figure 6:
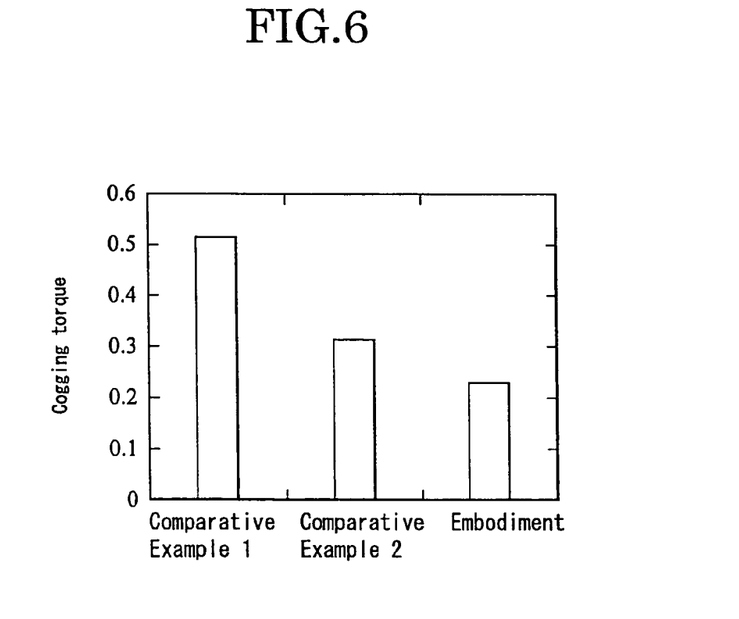
FIG. 6 is a graph showing cogging torque of each motor used in a test.

Next, using the permanent magnet rotary motor of the present invention and permanent magnet rotary motors of comparative examples 1 and 2,the cogging torque of each of the motors were examined and measured. The permanent magnet rotary motor in the embodiment is an 8-pole 12-slot motor as shown in FIG. 1 in which the number of the permanent magnet magnetic pole portions P and the number of the slots N have the relation of P=4 m and N=6 m (in which m is the natural number equal to two). In this permanent magnet rotary motor, the number of the permanent magnet magnetic pole portions P is eight, while the number of the slots is 12. The permanent magnet rotary motor in the comparative example 1 is the motor in which two adjacent magnetic pole constituent portions are not connected by a connecting portion, so that all the slots are open. Except for this feature, the permanent magnet rotary motor in the comparative example 1 has the same structure as that of the motor in the embodiment. The permanent magnet rotary motor in the comparative example 2 is the motor in which 12 connecting portions have the same thickness in the radial direction as that of the first type connecting portions 29A. Except for this feature, the permanent magnet rotary motor in the comparative example 2 has the same structure as that of the permanent magnet rotary motor in the embodiment. FIG. 6 shows results of the measurement. It can be seen from FIG. 6 that the cogging torque can be reduced more than in the permanent magnet rotary motor in the comparative example 1 in which all the slots are open and in the permanent magnet rotary motor in the comparative example 2 in which all the connecting portions have the identical thickness in the radial direction as the thickness of the first type connecting portions 29A.

Figure 7:
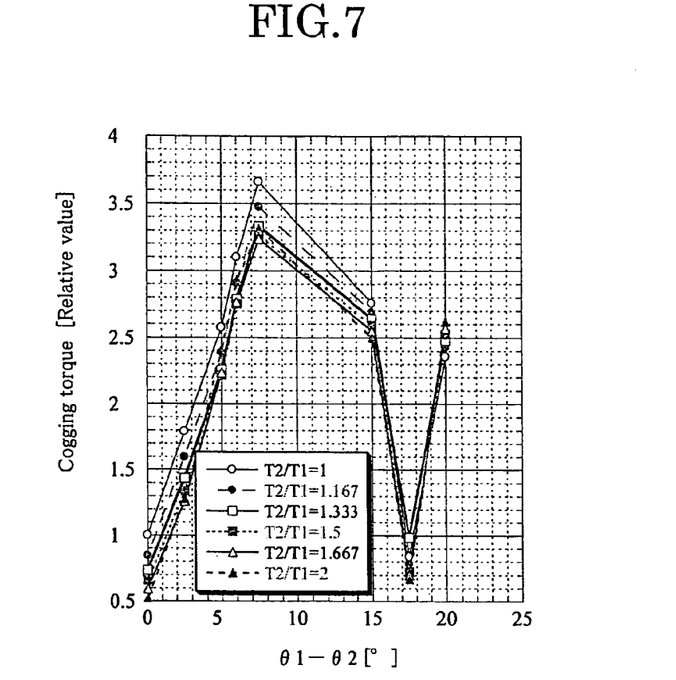
FIG. 7 is a graph showing a relation between an opening angle difference (θ1−θ2) and the cogging torque of each motor used in the test.
Figure 8:
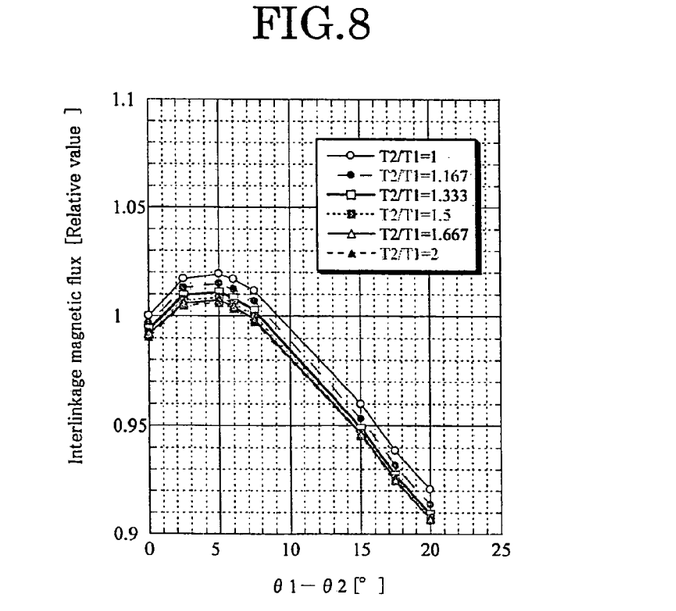
FIG. 8 is a graph showing a relation between the opening angle difference (θ1−θ2) and interlinkage magnetic flux of each motor used in the test.

Next, the permanent magnet rotary motors in this embodiment with various ratios T2/T1, which are the ratios obtained by dividing the thickness T2 of the second type connecting portion 29B by the thickness T1 of the first type connecting portion 29A, were fabricated. Then, a difference (θ1−θ2) between the opening angle θ1 of a part having substantially the identical thickness T1 for each of the first type connecting portions 29A and the opening angle θ2 of a part having substantially the identical thickness T2 for each of the second type connecting portions 29B is changed variously, and a relation between the opening angle difference (θ1−θ2) and the cogging torque and a relation between the opening angle difference (θ1−θ2) and interlinkage magnetic flux were examined. FIG. 7 shows the relation between the opening angle difference (θ1−θ2) and the cogging torque, while FIG. 8 shows the relation between the opening angle difference (θ1−θ2) and the interlinkage magnetic flux. FIG. 7 indicates values of the cogging torque relative to the value of the cogging torque that is set to unity when the ratio T2/T1 is one and the opening angle difference (θ1−θ2) is 0° (or when the angle θ1 is equal to the angle θ2). FIG. 8 indicates values of the interlinkage magnetic flux relative to the value of the interlinkage magnetic flux that is set to unity when the ratio T2/T1 is one and the opening angle difference (θ1−θ2) is 0°. It can be seen from FIG. 7 that the cogging torque can be reduced when the opening angle difference (θ1−θ2) is 0° or the opening angle θ1 is equal to the opening angle θ2 and when the opening angle difference (θ1−θ2) is 17.5°. However, when the opening angle difference (θ1−θ2) is set to 17.5°, the interlinkage magnetic flux would be greatly reduced, as shown in FIG. 8. For this reason, it can be seen that in order to reduce the cogging torque, it is preferable to set the opening angle difference (θ1−θ2) to 0°, or to set the opening angle θ1 to be equal to the opening angle θ2.

Figure 9:
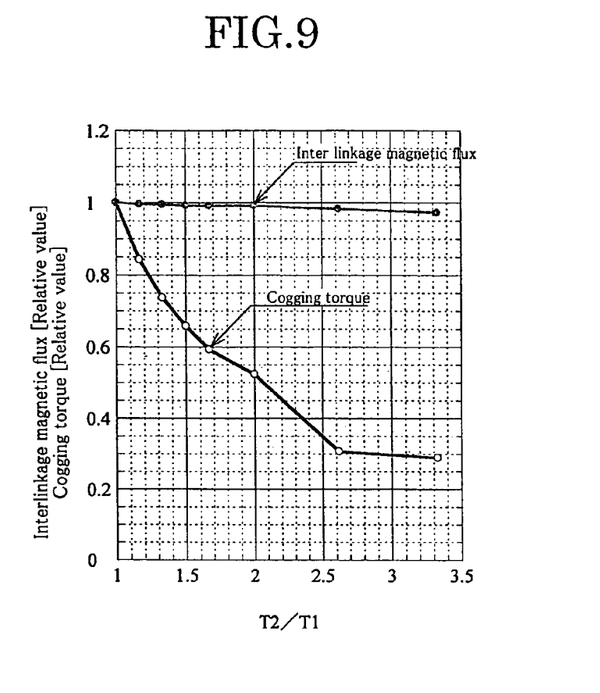
FIG. 9 is a graph showing a relation among a ratio T2/T1, the cogging torque, and the interlinkage magnetic flux of each motor used in the test.

Next, the value of the ratio T2/T1 is changed variously in the permanent magnet rotary motor in this embodiment in which the opening angle θ1 is equal to the opening angle θ2, and a relation among the ratio T2/T1, cogging torque, and interlinkage magnetic flux was examined. FIG. 9 shows the results of measurement of the cogging torque and the interlinkage magnetic flux. FIG. 9 shows relative values of the interlinkage magnetic flux and the cogging torque obtained in a case where the values of the cogging torque and the interlinkage magnetic flux are set to unity when the ratio T2/T1 is one. It can be seen from FIG. 9 when the ratio T2/T1 is set to be in a range from two to three, reduction of the interlinkage magnetic flux is suppressed, and the cogging torque can be reduced.

Figure 10:
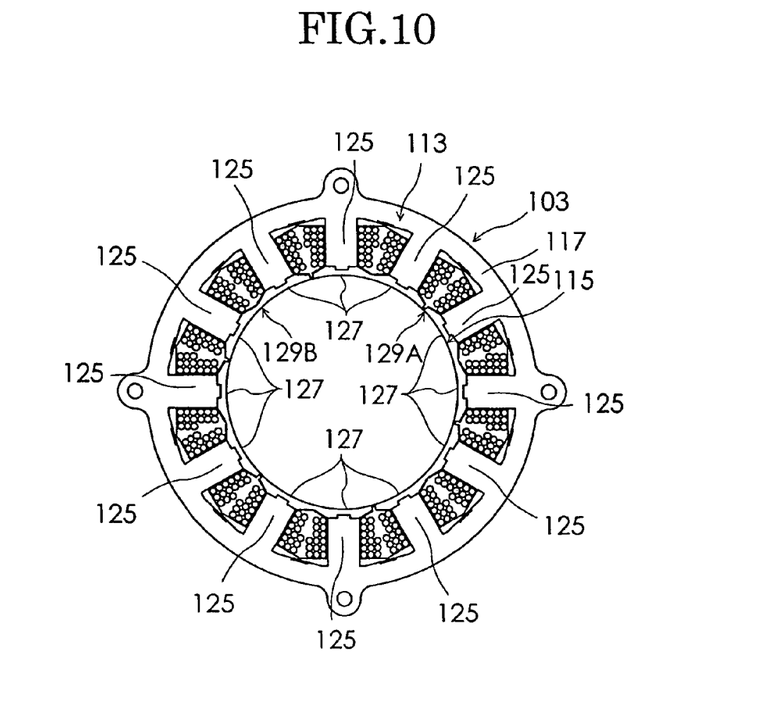
FIG. 10 is a schematic diagram of a permanent magnet rotary motor according to a second embodiment of the present invention.
Figure 11:
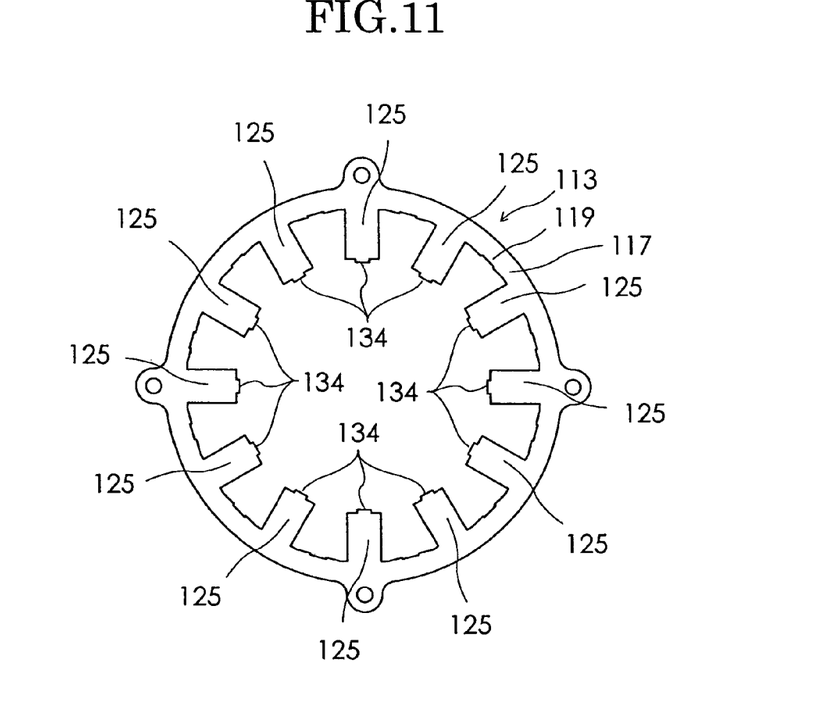
FIG. 11 is a plan view of a first divided core unit of a stator of the permanent magnet rotary motor shown in FIG. 7.

FIG. 10 is a schematic diagram of a stator 103 used in a permanent magnet rotary motor according to a second embodiment of the present invention. In the stator 103 in this embodiment, a first divided core unit 113 is constituted by a yoke portion 117 and 12 pole pieces 125 which are formed integrally with one another. A second divided core unit 115 is constituted by 12 magnetic pole surface constituent portions 127, six connecting portions 129A, and six connecting portions 129B, all of which are formed integrally with one another. Except for these features, the stator 103 has the same structure as that of the stator 3 in the first embodiment shown in FIG. 2. As shown in FIG. 11, the first divided core unit 113 is formed by lamination of a plurality of electromagnetic steel plates 119. The pole pieces 125 of the first divided core unit 113 are arranged on the inside of the yoke portion 117 at equal intervals in the circumferential direction of the annular yoke, with one ends thereof integrally fixed to the yoke portion 117. Then, at the other ends of the pole pieces 125, convex portions 134 to be fit into groove portions 128 of the second divided core unit 115, which will be described later, are formed.

Figure 12:
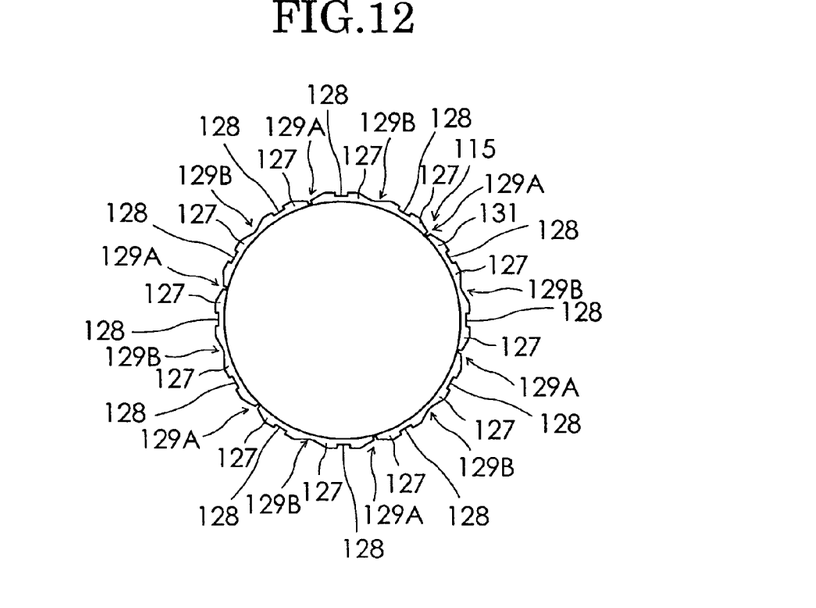
FIG. 12 is a plan view of a second divided core unit of the stator of the permanent magnet rotary motor shown in FIG. 7.

As shown in FIG. 12, the second divided core unit 115 is formed by lamination of a plurality of electromagnetic steel plates 131. Two adjacent ones of the magnetic pole surface constituent portions 127 of the second divided core unit 115 are mutually connected by a connecting portion 129A or a connecting portion 129B. Groove portions 128 into which the convex portions 134 of the pole pieces 125 are fit are formed at the magnetic pole surface constituent portions 127. By fitting the convex portions 134 into the groove portions 128, the second divided core unit 115 is joined with the first divided core unit 113.

The 12 connecting portions are divided into the first type connecting portions 129A arranged in the circumferential direction of the annular yoke and the second type connecting portions 129B that are alternately arranged with the first type connecting portions 129A in the circumferential direction of the annular yoke. As in the stator 3 in the first embodiment shown in FIG. 2, the thickness of the first type connecting portion 129A in the radial direction of the stator core is set to be smaller than the thickness of the second type connecting portion 129B in the radial direction of the stator core. Further, a circumferential length between positions of the first type connecting portion 129A having substantially the identical thickness is set to be larger than a circumferential length between positions of the second type connecting portion 129B having substantially the identical thickness.

Figure 13:
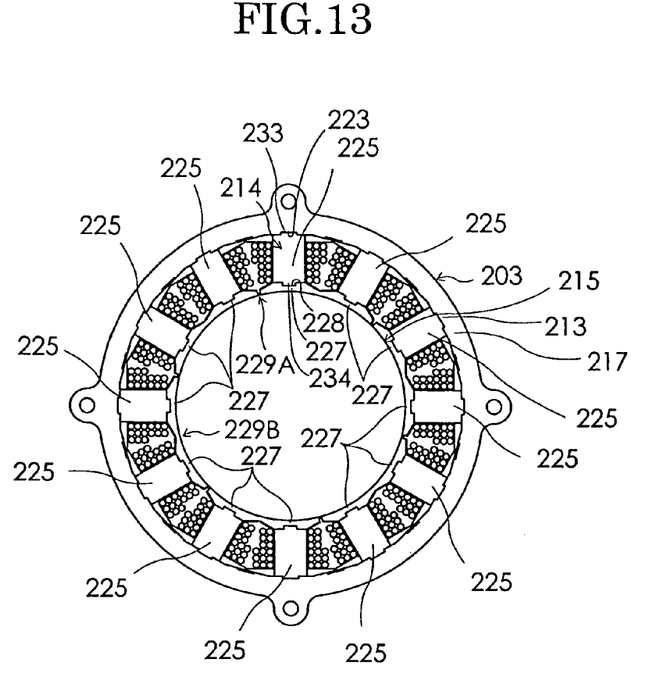
FIG. 13 is a schematic diagram of a permanent magnet rotary motor according to a third embodiment of the present invention.

FIG. 13 is a schematic diagram of a stator 203 used in a permanent magnet rotary motor according to a third embodiment of the present invention. The stator 203 in this embodiment is constituted by a first divided core unit 213, a second divided core unit 215, and a third divided core unit 214. In the stator 203, the first divided core unit 213 constitutes a yoke portion 217. The second divided core unit 215 constitutes 12 magnetic pole surface constituent portions 227, six connecting portions 229A, and six connecting portions 229B, all of which are formed integrally with one another. The third divided core unit 214 constitutes 12 pole pieces 225. Except for these features, the stator 203 has the same structure as that of the stator 3 in the first embodiment, shown in FIG. 2. Each of the first divided core unit 213, second divided core unit 215, and third divided core unit 214 is constituted by lamination of a plurality of electromagnetic steel plates.

Groove portions 223 are formed at the inner peripheral portion of the yoke portion 217 of the first divided core unit 213 at equal intervals in a circumferential direction of the third divided core unit 214. Convex portions 233 of the third divided core unit 214, which will be described later, are fit into the groove portions 223.

Two adjacent ones of the magnetic pole surface constituent portions 227 of the second divided core unit 215 are mutually connected by a connecting portion 229A or a connecting portion 229B. Groove portions 228 are formed in the magnetic pole surface constituent portions 227. Convex portions 234 of the third divided core unit 214, which will be described later, are fit into the groove portions 228.

The 12 connecting portions are divided into the first type connecting portions 229A arranged in the circumferential direction of the annular yoke and the second type connecting portions 229B that are alternately arranged with the first type connecting portions 229A in the circumferential direction of the annular yoke. As in the stator 3 in the first embodiment shown in FIG. 2, the thickness of the first type connecting portion 229A in the radial direction of the stator core is set to be smaller than the thickness of the second type connecting portion 229B in the radial direction of the stator core. Further, a circumferential length between positions of the first type connecting portion 229A having substantially the identical thickness is set to be larger than a circumferential length between positions of the second type connecting portion 229B having substantially the identical thickness.

The convex portions 233 to be fit into the groove portions 223 of the yoke portion 217 are provided integrally with one ends of the pole pieces 225 of the third divided core unit 214. At the other ends of the pole pieces 225, the convex portions 234 to be fit into the groove portions 228 of the magnetic pole surface constituent portions 227 are formed. By the fitting between the convex portions 233 and the groove portions 223, the third divided core unit 214 is joined with the first divided core unit 213. By the fitting between the convex portions 234 and the groove portions 228, the third divided core unit 214 is joined with the second divided core unit 215.

Figure 14:
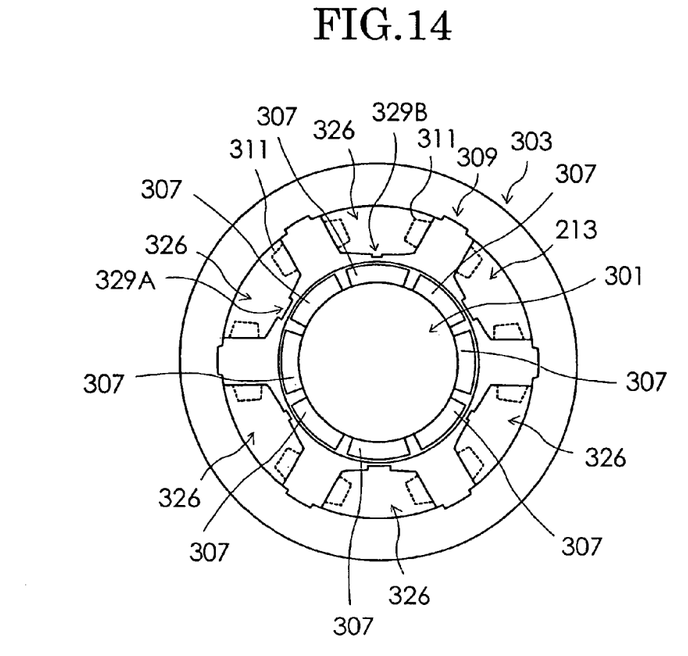
FIG. 14 is a schematic diagram of a permanent magnet rotary motor according to a fourth embodiment of the present invention.
Figure 15:
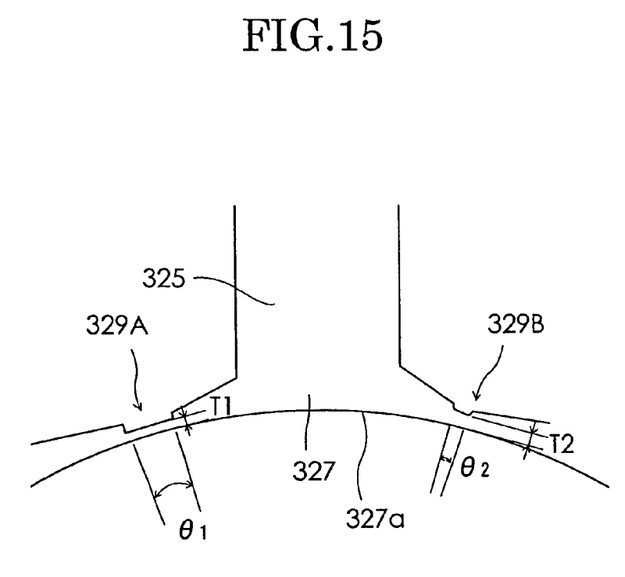
FIG. 15 is a partially enlarged view of FIG. 14.

FIG. 14 is a schematic diagram of a permanent magnet rotary motor according to a fourth embodiment of the present invention. The permanent magnet rotary motor in this embodiment has eight permanent magnet magnetic pole portions 307 and six slots 326. Accordingly, the number of the permanent magnet magnetic pole portions P is eight, and the number of the slots N is six. Then, the number of the permanent magnet magnetic pole portions P and the number of the slots N have a relation of P=8 m and N=6 m (in which m is a natural number, and in this embodiment m is one). Permanent magnets constituting the permanent magnet magnetic pole portions 307 are arranged on the surface of a rotor 301. Except for these features, the permanent magnet rotary motor in the fourth embodiment has the same structure as that of the permanent magnet rotary motor in the first embodiment, shown in FIG. 1. For this reason, 300 is added to reference numerals of components of the permanent magnet rotary motor in the fourth embodiment that are the same as the components of the permanent magnet rotary motor in the first embodiment. Then, description of the components will be omitted. In FIG. 14, only parts of exciting winding portions 311 are described by broken lines. In the motor in this embodiment, as shown in a partially enlarged view of FIG. 15, the thickness T1 of a first type connecting portion 329A in the radial direction of the stator core is set to be smaller than thickness T2 of a second type connecting portion 329B in the radial direction of the stator core. Further, the opening angle θ1 of a part having substantially the identical thickness T1 for each of said first type connecting portions is set to be larger than the opening angle θ2 of a part having substantially the identical thickness T2 for each of said first type connecting portions. In this embodiment, the ratio T2/T1 of the thickness T2 of the second type connecting portion 329B to the thickness T1 of the first type connecting portion 239A is in the range of 1.4 to 1.8. Further, the opening angles θ1 and θ2 are set so that the opening angle difference (θ1−θ2) is equal to [360°/LCM(P, N)]×(⅓)±1°. The LCM(P, N) indicates a least common multiple between the numbers P and N. For this reason, the opening angle difference (θ1−θ2) is set to be in the range of 4 to 6°.

Figure 16:
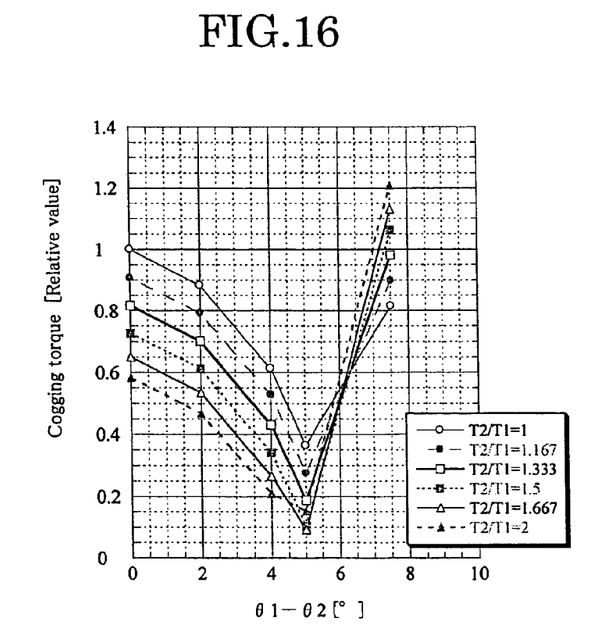
FIG. 16 is a graph showing a relation between the opening angle difference (θ1−θ2) and the cogging torque of each motor used in a test.
Figure 17:
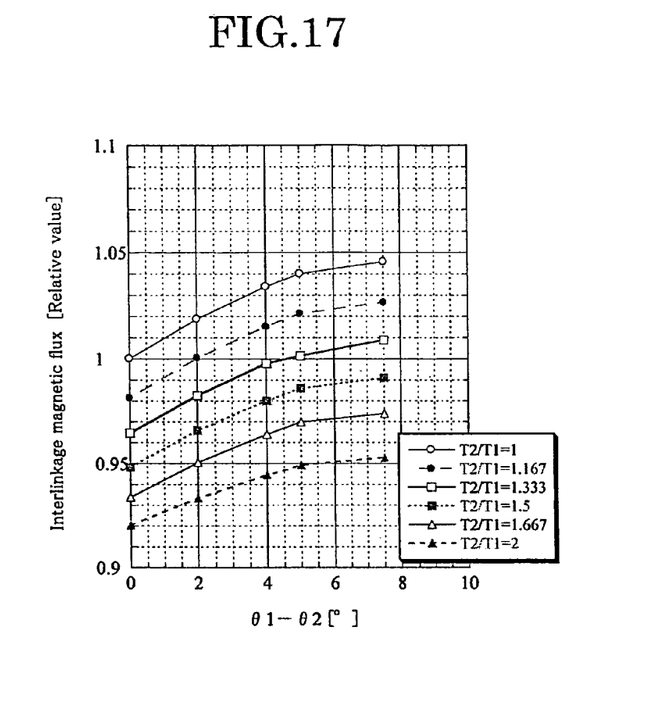
FIG. 17 is a graph showing a relation between the opening angle difference (θ1−θ2) and the interlinkage magnetic flux of each motor used in the test.

Next, the permanent magnet rotary motors in this embodiment with the various ratios T2/T1 obtained by dividing the thickness T2 of the second type connecting portion 329B by the thickness T1 of the first type connecting portion 239A were fabricated. These permanent magnet rotary motors have the relation of P=8 m and N=6 m (in which m is a natural number). Then, the opening angle difference (θ1−θ2) between the opening angle θ1 of a part having substantially the identical thickness T1 for each of said first type connecting portions 329A having substantially the identical thickness T1 from the opening angle θ2 of a between positions of the second type connecting portions 329B having substantially the identical thickness T2 is changed variously, and the relation between the opening angle difference (θ1−θ2) and the cogging torque and the relation between the opening angle difference (θ1−θ2) and the interlinkage magnetic flux were examined. FIG. 16 shows the relation between the opening angle difference (θ1−θ2) and the cogging torque, while FIG. 17 shows the relation between the opening angle difference (θ1−θ2) and the interlinkage magnetic flux. FIG. 16 indicates values of the cogging torque relative to the value of the cogging torque that is set to unity when the ratio T2/T1 is one and the opening angle difference (θ1−θ2) is 0°. FIG. 17 indicate values of the interlinkage magnetic flux relative to the value of the interlinkage magnetic flux that is set to unity when the ratio T2/T1 is one and the opening angle difference (θ1−θ2) is 0°. It can be seen from FIG. 16 that in the motors that have the relation of P=8 m and N=6 m (in which m is a natural number), the cogging torque can be reduced when the opening angle difference (θ1−θ2) is in the range of 4 to 6° or is equal to [360°/LCM(P, N)]×(⅓)±1°. It can be seen that especially when the opening angle difference (θ1−θ2) is set to 5° or is equal to [360°/LCM(P, N)]×(⅓)°}, the cogging torque can be minimized. Further, it can be seen, as shown in FIG. 17, when the opening angle difference (θ1−θ2) is below 4° or below [360°/LCM(P, N)]×(⅓)−1°}, the interlinkage magnetic flux is greatly reduced.

Figure 18:
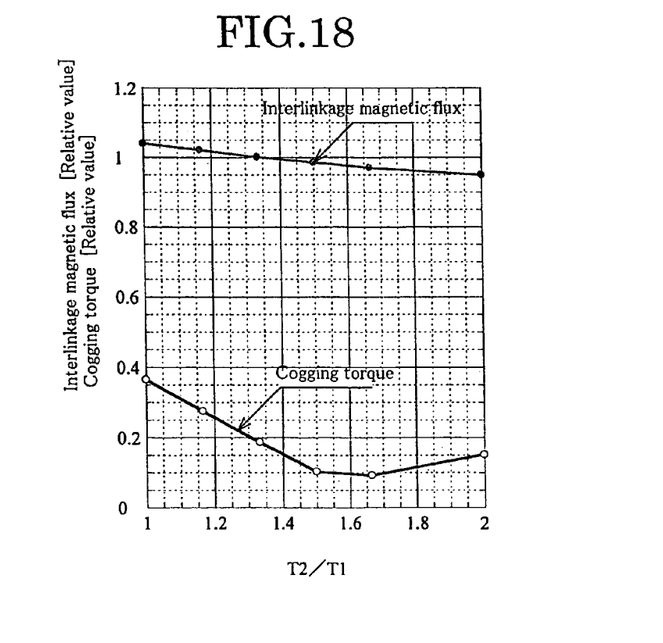
FIG. 18 is a graph showing a relation among the ratio T2/T1, cogging torque, and interlinkage magnetic flux of each motor used in the test.

Next, the value of the ratio T2/T1 is changed variously in the permanent magnet rotary motor in this embodiment, and the relation among the ratio T2/T1, cogging torque, and interlinkage magnetic flux was examined. FIG. 18 shows the result of measurement of the cogging torque. FIG. 18 shows values of the interlinkage magnetic flux relative to the value of the interlinkage magnetic flux that is set to 1.05 when the ratio T2/T1 is one and values of the cogging torque relative to the value of the cogging torque that is set to 0.35 when the ratio T2/T1 is one. It can be seen from FIG. 18 when the ratio T2/T1 is set to be in the range of 1.4 to 1.8, reduction of the interlinkage magnetic flux is suppressed, and the cogging torque can be reduced.

While the preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is

1. A permanent magnet rotary motor comprising:
    a rotor comprising:
        a rotor core; and
        permanent magnet magnetic pole portions comprising P (p: a natural even number) permanent magnets mounted to said rotor core;
    a stator core comprising:
        an annular yoke;
        N pole pieces (N: a natural even number) arranged on an inside of said annular yoke at intervals in a circumferential direction of said annular yoke, each of said N pole pieces having one end fixed to said yoke portion and the other end located more inwardly in a radial direction of said stator core than the one end;
        N slots each located between two adjacent pole pieces of said N pole pieces;
        a plurality of magnetic pole surface constituent portions each located at the other end and each having a magnetic pole surface facing said rotor; and
        a plurality of connecting portions each mutually coupling two adjacent magnetic pole surface constituent portions of said magnetic pole surface constituent portions; and
    a plurality of exciting winding portions provided respectively at said N pole pieces,
    wherein said connecting portions are divided into two types, first type connecting portions and second type connecting portions, said first type connecting portions being alternately arranged in the circumferential direction, said second type connecting portions being so arranged as to alternate with said first type connecting portions in the circumferential direction,
    wherein a thickness T1 of each of said first type connecting portions in the radial direction is smaller than a thickness T2 of each of said second type connecting portions in the radial direction, and
    wherein the stator core has an annular flat surface facing the rotor.

2. The permanent magnet rotary motor according to claim 1, wherein the number of said permanent magnet magnetic pole sections P and the number of said slots N have a relation of P=4 m and N=6 m (m: a natural number); and
    the thicknesses T1 and T2 have a relation in which a ratio T2/T1 is in the range of two to three.

3. The permanent magnet rotary motor according to claim 1, wherein said stator core comprises a combination of divided core units of a plurality of types, each constituted by lamination of a plurality of electromagnetic steel plates; and
    said divided core unit comprises:
        a first divided core unit constituting said yoke portion; and
        a second divided core unit constituted integrally by said pole places, said magnetic pole surface constituent portions, and said connecting portions, said pole pieces, said magnetic pole surface constituent portions.

* * * * *